(12) United States Patent
Chen et al.

(10) Patent No.: US 7,477,617 B2
(45) Date of Patent: Jan. 13, 2009

(54) MULTICAST SESSION MANAGEMENT SYSTEM

(75) Inventors: Shiwen Chen, Marlboro, NJ (US); Harumine Yoshiba, Yokohama (JP); Hongbing Li, Belle Mead, NJ (US)

(73) Assignee: Panasonic Corporation, Osaka (JP)

( * ) Notice: Subject to any disclaimer, the term of this patent is extended or adjusted under 35 U.S.C. 154(b) by 734 days.

(21) Appl. No.: 11/058,559

(22) Filed: Feb. 15, 2005

(65) Prior Publication Data

US 2005/0157742 A1    Jul. 21, 2005

Related U.S. Application Data

(63) Continuation-in-part of application No. 10/445,380, filed on May 23, 2003, now Pat. No. 6,950,432.

(51) Int. Cl.
*H04H 1/00*    (2006.01)
*H04L 12/56*   (2006.01)
*G06F 15/16*   (2006.01)

(52) U.S. Cl. ................ 370/312; 370/390; 370/432; 709/227

(58) Field of Classification Search ............... 370/312, 370/390, 432; 709/223–226, 227–229; 707/10
See application file for complete search history.

(56) References Cited

U.S. PATENT DOCUMENTS

| | | | |
|---|---|---|---|
| 6,046,989 A | 4/2000 | Takahashi | |
| 6,262,982 B1 | 7/2001 | Donahue et al. | |
| 6,321,270 B1 * | 11/2001 | Crawley | 709/238 |
| 6,331,983 B1 | 12/2001 | Haggerty et al. | |
| 6,532,233 B1 | 3/2003 | Matsunaga et al. | |
| 6,556,544 B1 | 4/2003 | Lee | |
| 6,567,851 B1 | 5/2003 | Kobayashi | |
| 6,633,544 B1 | 10/2003 | Rexford et al. | |
| 6,798,755 B2 * | 9/2004 | Lillie et al. | 370/312 |
| 7,023,813 B2 * | 4/2006 | Newberg et al. | 370/312 |

OTHER PUBLICATIONS

Hanna et al., "Multicast Address Dynamic Client Allocation Protocol (MADCAP)", Dec. 1999, Network Working Group, RFC 2730, pp. 1-54.*
"Aggregated Multicast: an Approach to Reduce Multicast State", UCLA CSD TR #010012, Aiguo Fei, et al., 11 pages, (Nov. 2001).
"An Architecture for Scalable QoS Multicast Provisioning", UCLA CSD TR #010030, Jun-Hong Cui, et al., 21 pages, (Aug. 2001).

(Continued)

*Primary Examiner*—Chi H. Pham
*Assistant Examiner*—Tri H. Phan
(74) *Attorney, Agent, or Firm*—Harness, Dickey & Pierce, PLC

(57) ABSTRACT

A centralized multicast session management system is provided for managing resources in a multicast environment. The session management system includes: at least one multicast application that initiates a request for a multicast session; a session manager is configured to receive the session request from the multicast application and to assign a multicast address for the requested multicast session; and a routing and network manager for managing network resources, where the session manager interacts with the routing and network manager to allocate network resources for the requested multicast session before the multicast address is communicated to the multicast application.

15 Claims, 9 Drawing Sheets

OTHER PUBLICATIONS

"End to End Aggregation of Multicast Addresses", R. Briscoe, et al., Internet Draft of Internet Engineering Task Force (IEFT), Nov. 21, 1997, 22 pages.

"A Protocol to Improve the State Scalability of Source Specific Multicast", Jun-Hong Cui, et al., 6 pages, (Nov. 2002).

"Aggregated Multicast with Inter-Group Tree Sharing", Aiguo Fei, et al., 15 pages, (Nov. 2001).

"Aggregated Multicast for Scalable QoS Multicast Provisioning", Mario Gerla, et al., 14 pages, (Sep. 2001).

"Exploiting the Bandwidth-Memory Tradeoff in Multicast State Aggregation", Pavlin Ivanov Radoslavov, et al., 11 pages, (Jul. 1999).

"Aggregated Hierarchical Multicast for Active Networks", Tilman Wolf, et al., Washington University in St. Louis School of Engineering & Applied Science, Feb. 23, 2001, 17 pages.

RFC 2327—SDP: Session Description Protocol, http://www.faqs.org/rfcs/rfc2327.html., Apr. 1998.

RFC 2907—MADCAP Multicast Scope Nesting State Option, http://www.faqs.org/rfcs/rfc2907.html., Sep. 2000.

\* cited by examiner

MULTICAST SESSION MANAGEMENT SYSTEM

CROSS-REFERENCE TO RELATED APPLICATIONS

This application is a continuation-in-part of U.S. patent application Ser. No. 10/445,380 filed on May 23, 2003. The disclosure of the above application is incorporated herein by reference.

FIELD OF THE INVENTION

The present invention relates to multicasting and, more particularly, to a centralized architecture for managing multicast resources to meet the application requirements.

BACKGROUND OF THE INVENTION

IP multicast is widely used for data/media distribution purposes because it allows efficient use of network resources to deliver data from one or more sources to multiple receivers. Many application systems are adopting this technology to distribute bandwidth-intensive data to save the network resources and therefore lowering the network cost for such application. However, the performance for multicast applications are often out of the control of application itself. Without proper management, multicasting can be harmful to network performance.

Therefore, it is desirable to provide a management framework for multicast intensive systems to manage the multicast sessions, address allocation, routing path computation, multicast security, and network resource utilizations.

SUMMARY OF THE INVENTION

A centralized multicast session management system is provided for managing resources in a multicast environment. The session management system includes: at least one multicast application that is able to initiate a request for a multicast session; a session manager adapted to receive the session request from the multicast application and operable to assign at least one multicast address for the requested multicast session; and a routing and network manager for managing network resources, where the session manager interacts with the routing and network manager to allocate network resources for the requested multicast session before the multicast address is communicated to the multicast application.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

A multicast session is a communication flow between one or more multicast source application instances and one or more multicast receiver application instances. These instances share one or more of the same multicast communication channels. A multicast session shall be identified with a uniform resource identifier. It is further defined by the following properties: name, description information, list of channels, authentication specification, timing specification and membership information, including a source list and a destination list.

A multicast channel is one thread of a multicast communication. A channel is determined by a multicast address and a transport layer port number (e.g., UDP port). Besides, the channel has the following properties: channel description, injection type (e.g., one-source or multiple-source), flow type (e.g., variable or constant bit rate), reliability requirement (e.g., reliable, real-time, or best-effort), bandwidth specification (i.e., minimum required bandwidth, peak bandwidth, average bandwidth, etc.), flow specification (i.e., minimum packet size, maximum packet size, average packet size, etc.) and security specifications.

Figure 1:
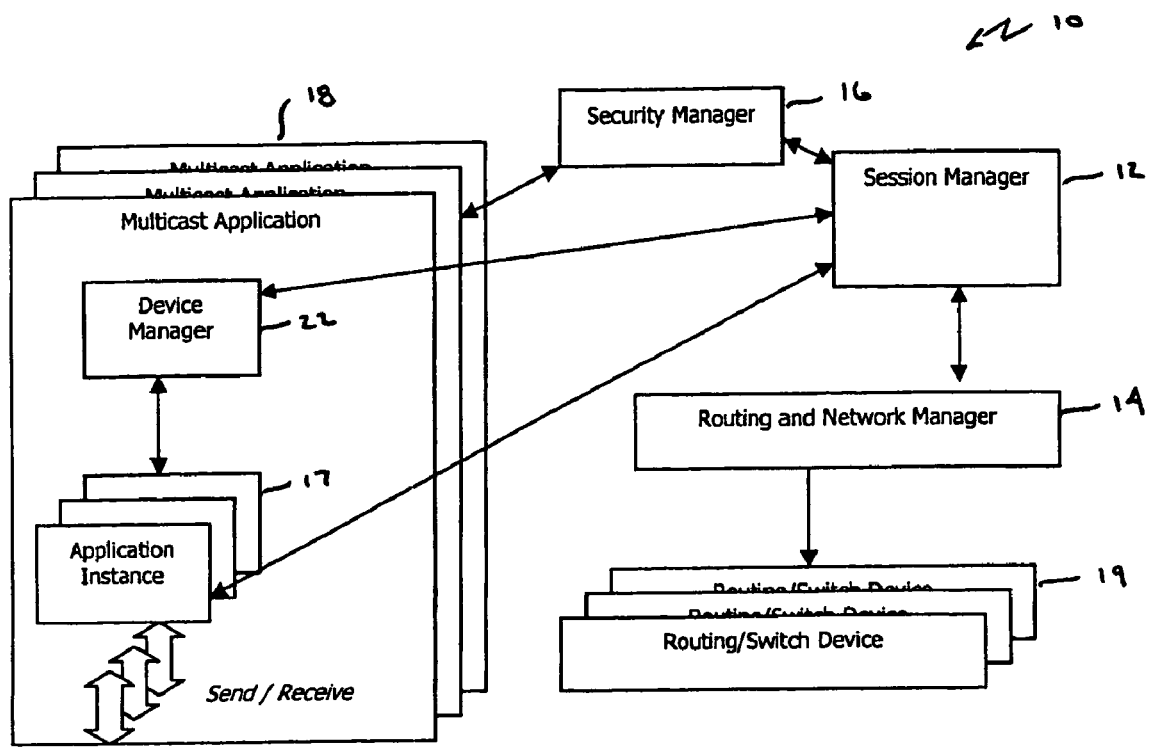
FIG. 1 depicts a multicast session management system according to the principles of the present invention.

FIG. 1 depicts a multicast session management system according to the principles of the present invention. The multicast session management system 10 is comprised generally of a session manager 12, a routing and network manager 14, a security manager 16, multicast applications 18 and networking devices 19 (e.g., routers and switches). It is readily understood that the network environment may include other types of network components.

A multicast application 18 is a class of multicast application instances 17, which can be further categorized as multicast source application instances and multicast receiver application instances. For example, in a multicast-based video surveillance system (i.e. video surveillance application), a multicast-capable network camera is an exemplary multicast source application instance and a surveillance monitor capable of receiving multicasted surveillance video is an exemplary multicast receiver application instance.

Optionally, a multicast application may contain an application configuration manager 22 (also referred to as a device manager). If a device manager is present for a certain application, the device manager is responsible to initiate/close the application sessions, as well as interact with multicast application instances to further distribute the multicast session resources to the multicast application instances.

Figure 2:
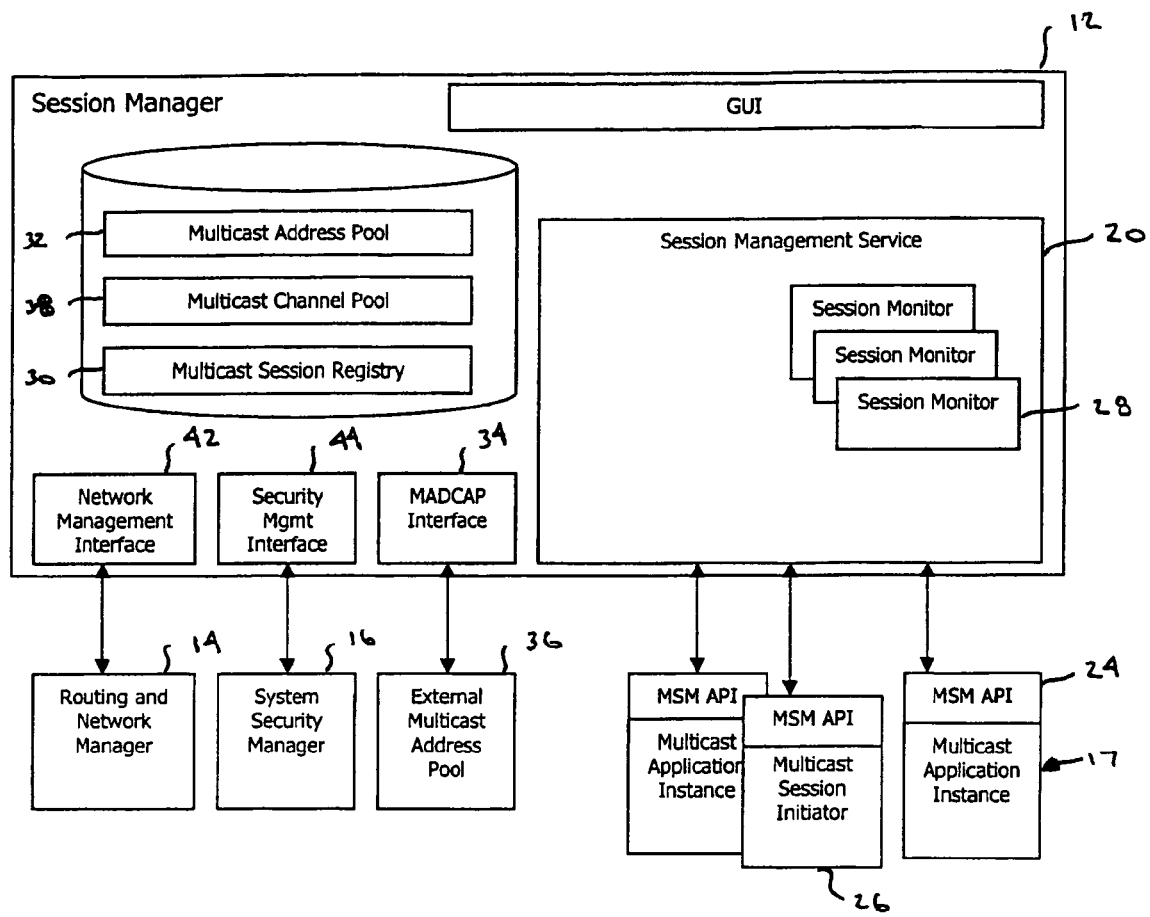
FIG. 2 depicts an exemplary session manager in accordance with the present invention.

Referring to FIG. 2, the session manager 12 is designed to manage all multicast sessions in the network. Session management functions are primarily implemented by a session management service 20 residing on the session manager 12. The session management service 20 also interfaces with other services, external interfaces, and data stores. Each of these components are further described below.

Multicast applications must register with the session manager 12 to obtain access to the network for multicasting traffic. A session manager application program interface (API) 24 provides the interface to register with the session manager 12. In addition to application registration, the session manager API may also provide interfaces to: initialize a connection with the session manager, register a session request, make a change to a registered session, cancel a session, unregister an application instance with the session manager, provide performance feedback to a session monitor, and request information regarding a registered session. It is readily understood that each of these requested functions are implemented by a session management service 20.

An multicast session initiator 26 is a software component that initiates the session registration procedure. The session initiator 26 can be part of an application instance or can be a dedicated entity implemented in conjunction with another type of network component, such as the device manager.

Upon receiving a session registration request, the session management service 20 may assign at least one multicast address for the requested session as will be further described below. To do so, the session management service 20 maintains a pool 32 of available multicast addresses. A multicast address can then be allocated from the address pool 32. Alternatively, the session management service 20 may interface with an external server to obtain an available multicast address. In an exemplary embodiment, the session management service 20 reserves a block of address for the address pool 32 through the use of the Multicast Address Dynamic Client Allocation protocol and, if necessary, may reserve additional addresses as needed.

Each channel is identified by a unique combination of a multicast address and a port number. To the extent that a session employs more than one channel, the session management service 20 must also assign a transport layer port number for each channel in the requested session. The port number can likewise be allocated from a pool 38 of available port numbers.

In addition, a network management interface 42 enables the session management service 20 to interface with a routing and network manager 14 in order to allocate network resources for a requested multicast session. More specifically, the routing and network manager 14 is operable to compute a preferred network path for a requested session as well as reserve network bandwidth for the session. When a channel is removed from a session, the routing and network manager 14 is notified to release these resources. Similarly, if changes occur is channel properties which requires a change in allocated network resources, the routing and network manager 14 is notified so that network resources may be reallocated accordingly. An exemplary routing and network manager 14 is further described in U.S. patent application Ser. No. 10/445,380 which is assigned to present assignee and incorporated by reference herein.

Figure 6A:
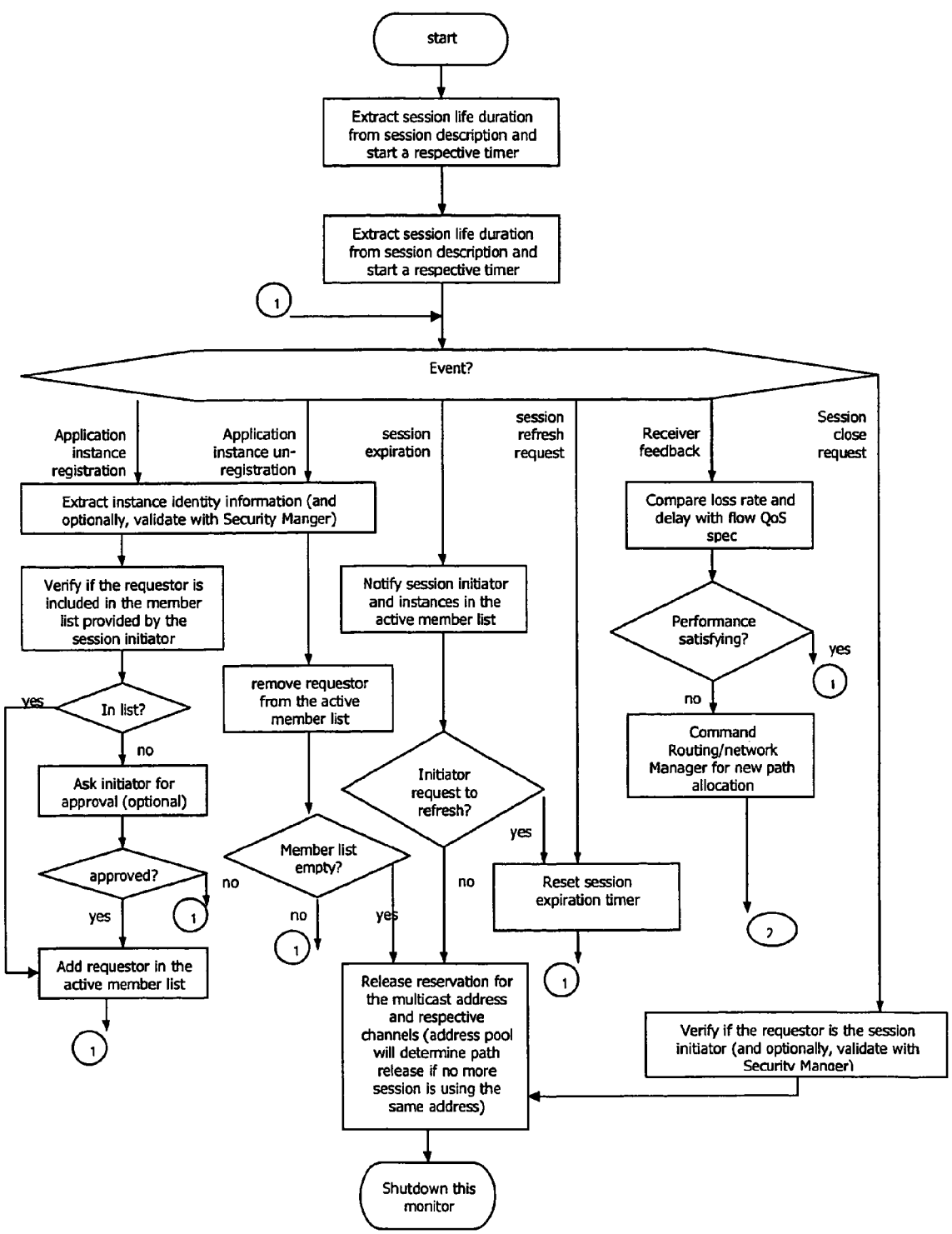
FIGS. 6A and 6B are flowcharts depicting an exemplary implementation for the session monitor of the present invention.
Figure 6B:
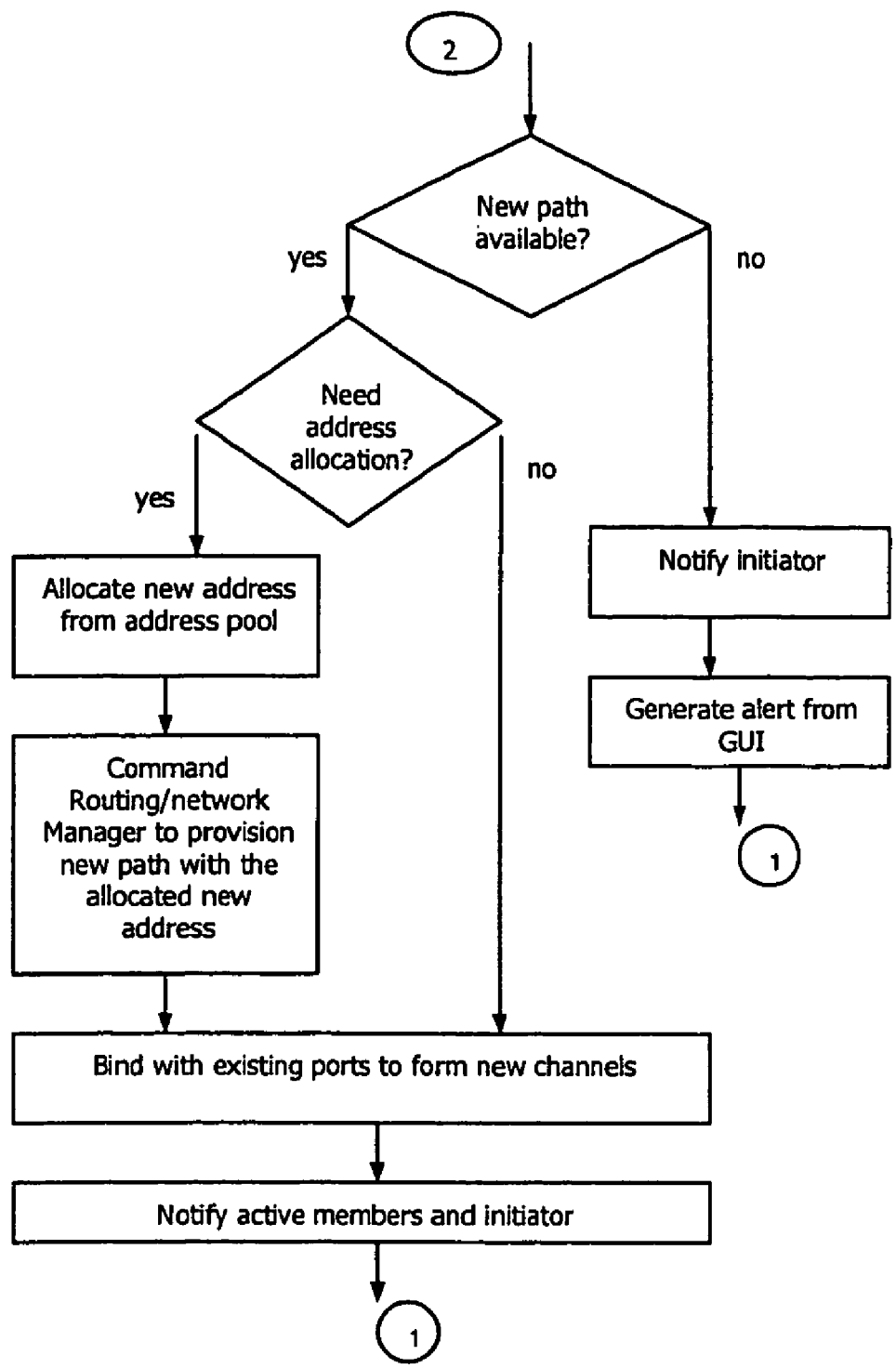

Upon successfully registering a session, the session management service 20 spawns an instance of a session monitor 28 to monitor the session. The session monitor is adapted to receive performance feedback for the session from the multicast applications associated with the session. In response to poor session performance, the session monitor 28 shall determine whether the current path allocation needs to be changed and, if so, interface with the routing and network manager to allocation a new path for the session. An exemplary implementation of the session monitor is shown in FIG. 6.

Information regarding registered sessions is also maintained by the session management service 20 in a session registry 30. Session information includes a uniform resource identifier, name, description information, list of channels, authentication specification, timing specification and membership information, including a source list and a destination list. As will be further described below, the session registry 30 also maintains an assigned multicast address and an assigned transport layer port number for each channel in a given session.

The session management service 20 may also employ the use of digital certificates. To do so, the session management service 20 interfaces via a security management interface 44 with a security manager 16. The security manager 16 issues an encrypted digital certificate containing a public key and other identification information. To authenticate each other, components in the network (multicast instances as well as the session manager) may obtain and validate digital certificates from the security manager 16. If the session content needs to be transmitted via encryption, the source may generate its keys and publish its public key via its registration procedure with the session manager, so that authenticated and authorized receivers may obtain the public key to decrypt the transmitted data.

In operation, the session initiator requests creation of a multicast session. The request is received by the session management service which in turn initiates the registration process. To register a session, the session management service first extracts the pertinent information from the request, such as multicast sources, multicast destinations, and QoS requirements. This session information is then inserted into the session registry 30. The session management service 20 may optionally interface with the security manager 16 to authenticate and authorize the session request from the requester.

Next, the session management service 20 invokes the routing and network manager to determine possible paths for the requested session. If an existing path can be used for the session, then the multicast address associated with this path is returned to the session manager. The session management service 20 updates the session registry 30 with the assigned multicast address, thereby binding the multicast session with the multicast address.

If a new path is needed for the session, then the routing and network manager 14 computes one or more paths for the session. The need for a new path is communicated to the session management service 20 which in turn assigns a multicast address for each requested channel in the session. When different channels use the same path, these channels are assigned the same multicast address, but are assigned different UDP port numbers to distinguish from each other. It is also contemplated that different channels in the same session many require different paths and thus are assigned different multicast addresses. The session management service 30 again updates the session registry 30 with the assigned multicast address and port number for each channel, thereby binding the multicast session. In addition, the session management service 20 communicates the assigned multicast address back to the routing and network manager 14.

The routing and network manager 14 will use the assigned multicast address to provision network routing devices 19 in a manner well known in the art. However, unlike conventional approaches, the network routing devices may only forward packets associated with registered sessions. Any other multicast traffic which enters the system will be discarded.

Figure 5A:
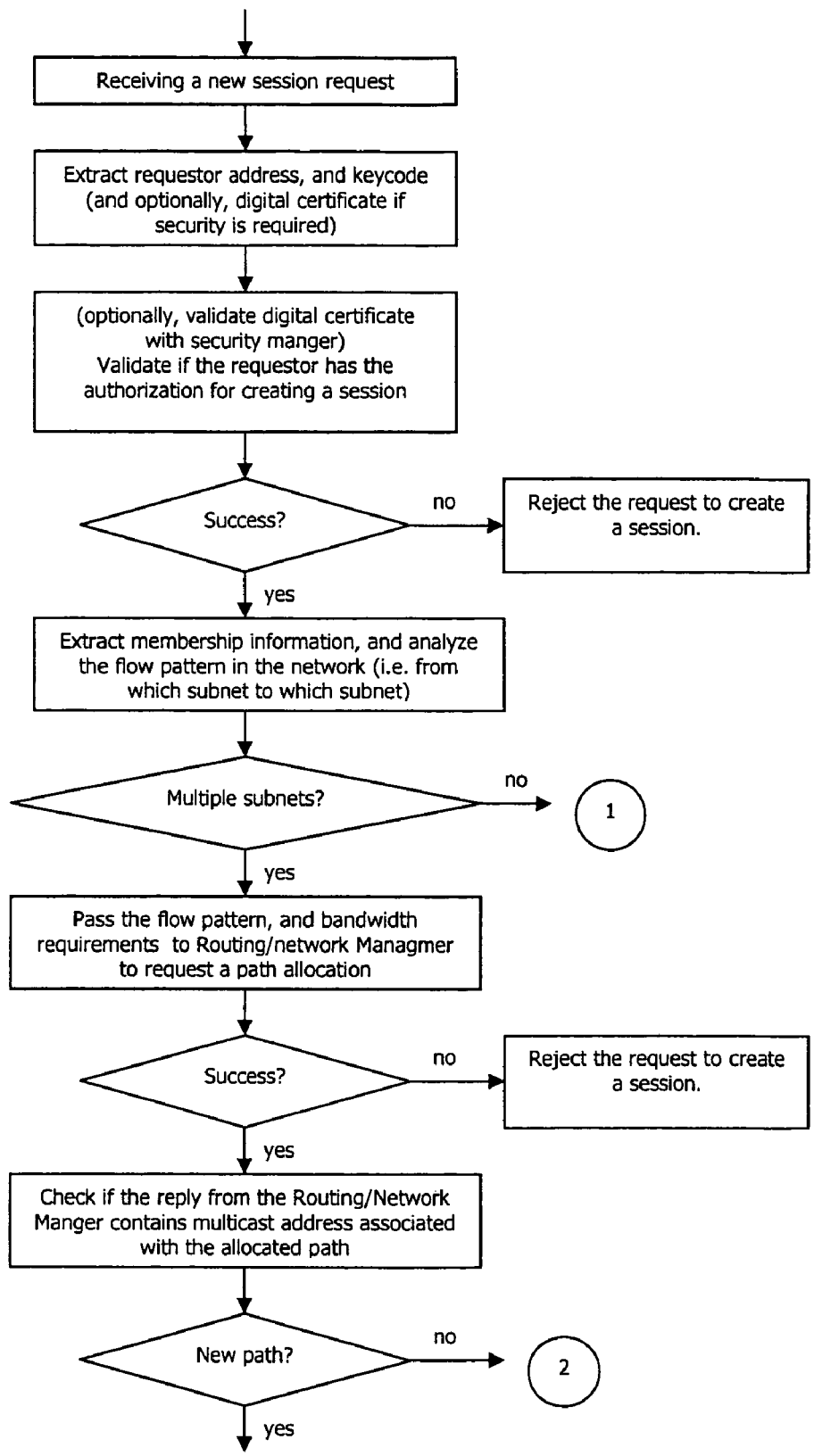
FIGS. 5A-5C are flowcharts depicting an exemplary session registration procedure as may be implemented by the session management service of the present invention.
Figure 5B:
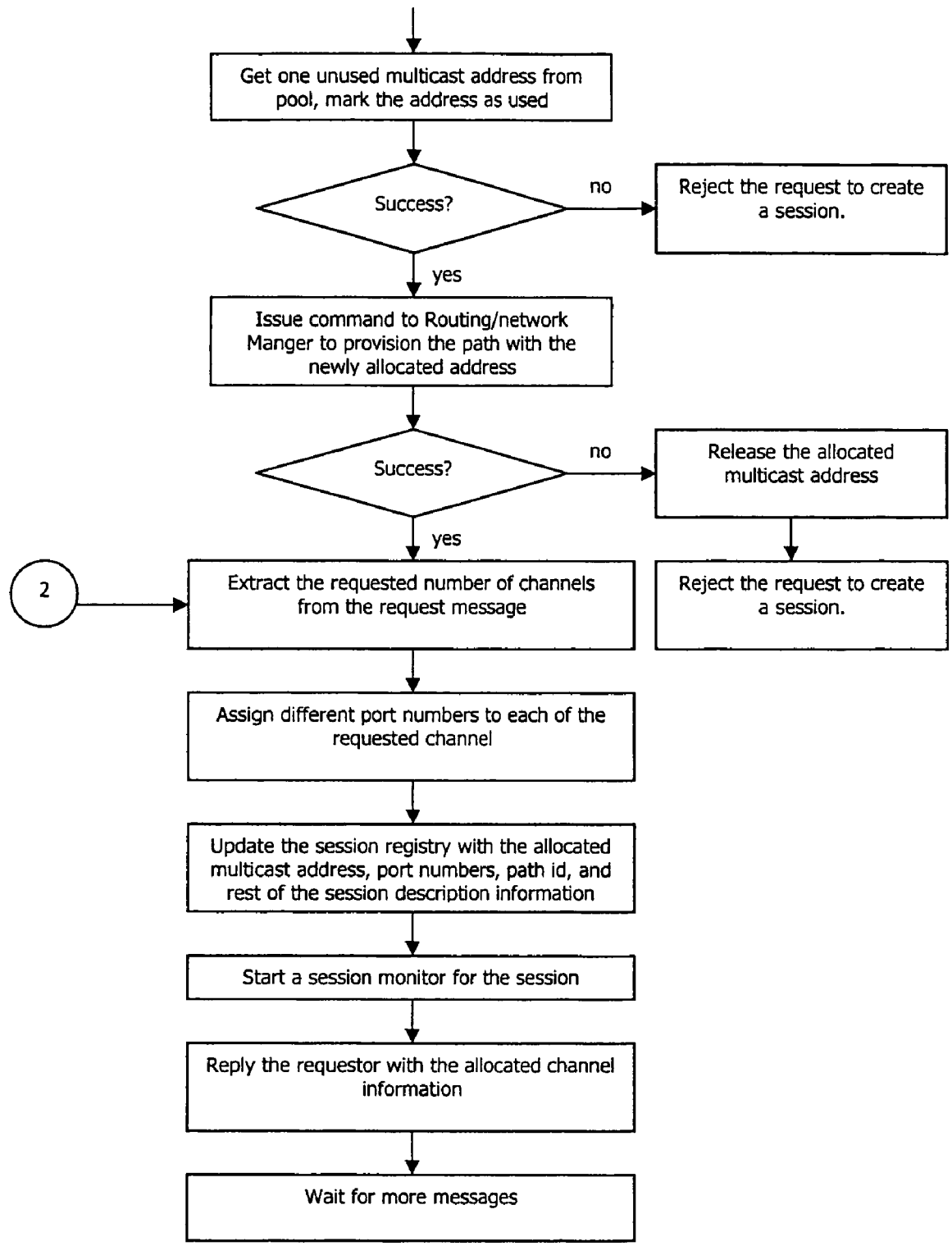
Figure 5C:
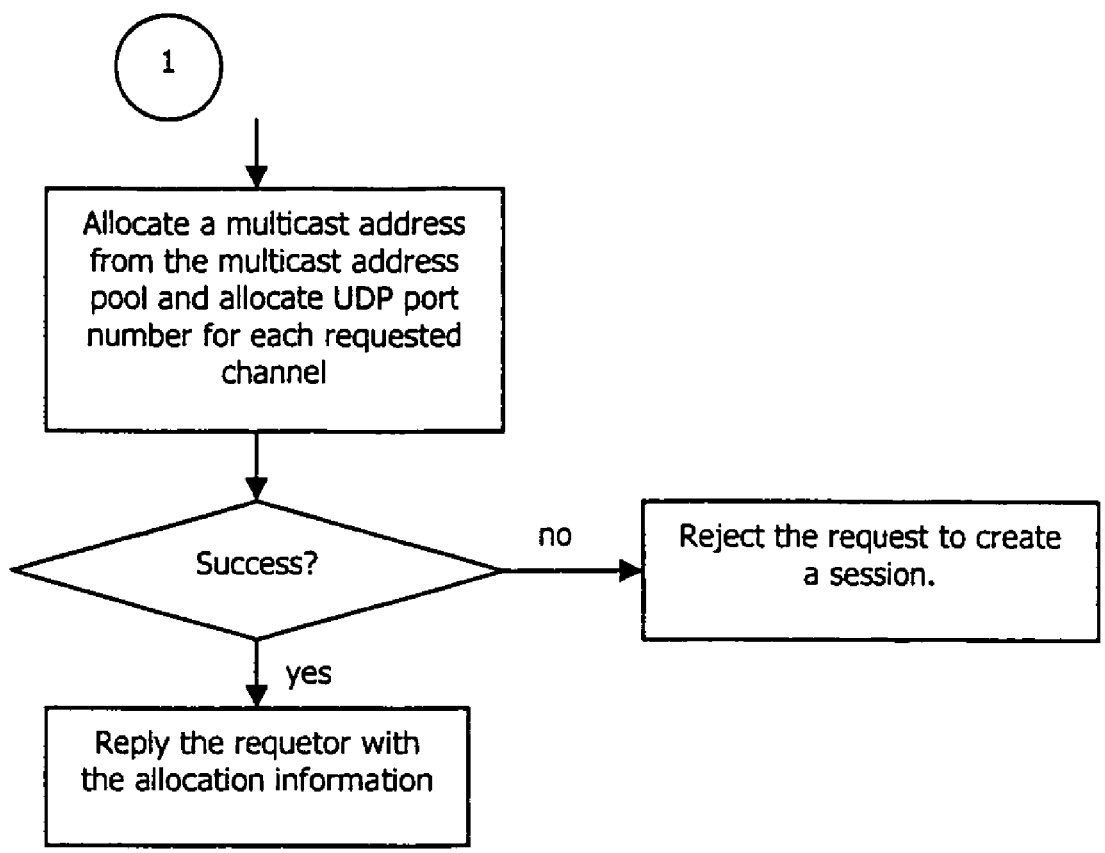

Once the requested session has been successful bound with at least one multicast address, the session management service 20 communicates the assigned multicast address to the requesting multicast application 18, thereby enabling initiation of the session. If no multicast address is available, a path is unable to be assigned, or some other failure occurs in the registration process, then the session request is not granted. In this way, the session manager wholly manages any multicasting which occurs in the network environment. A more detailed illustration of the registration procedure as may be implemented by the session management service is found in FIGS. 5A-5C.

In conventional approaches, each multicast session uses a different multicast address and is bound to the address for the lifetime of the session. Even if two multicast applications are aggregated under one address, it is difficult to regroup one of the sessions with another group or otherwise detach the two sessions. The multicast session management system of the present invention enables sessions to be dynamically assigned to different addresses without terminating the session.

Figure 3:
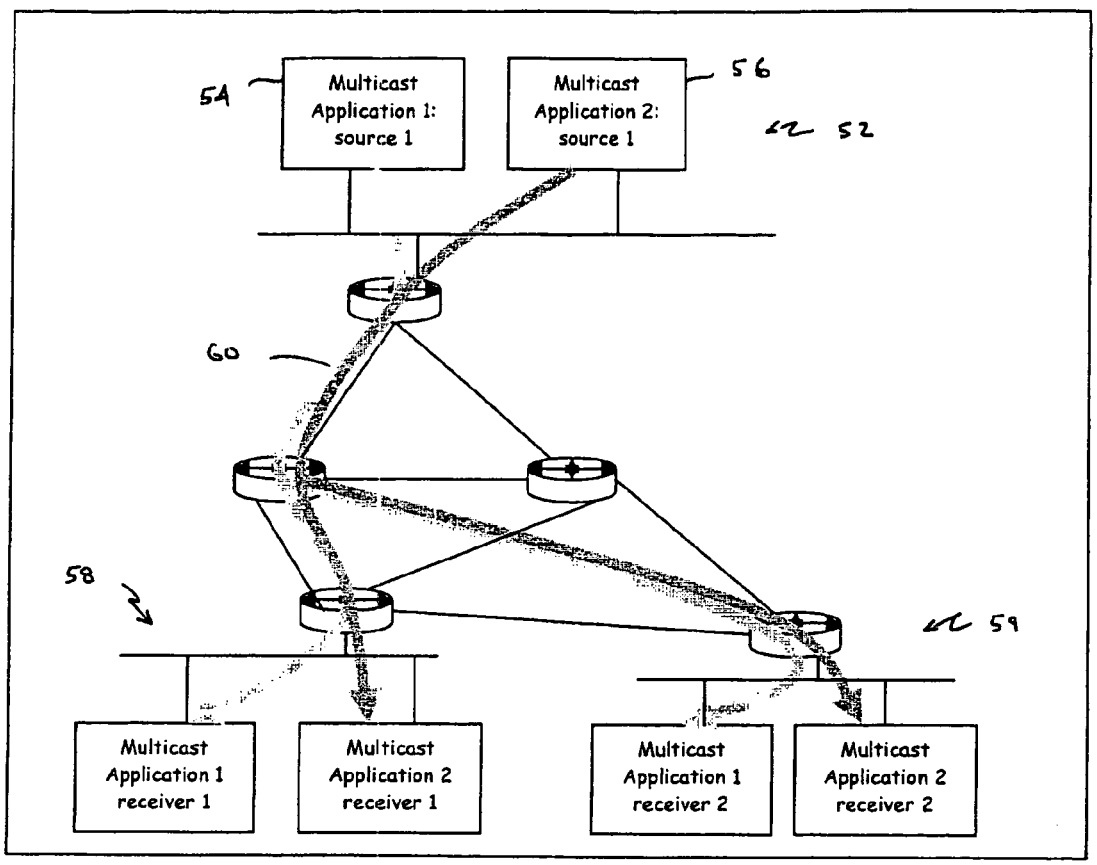
FIGS. 3 and 4 are diagrams illustrating how a path for a session may be dynamically changed by the multicast session management system of the present invention.
Figure 4:
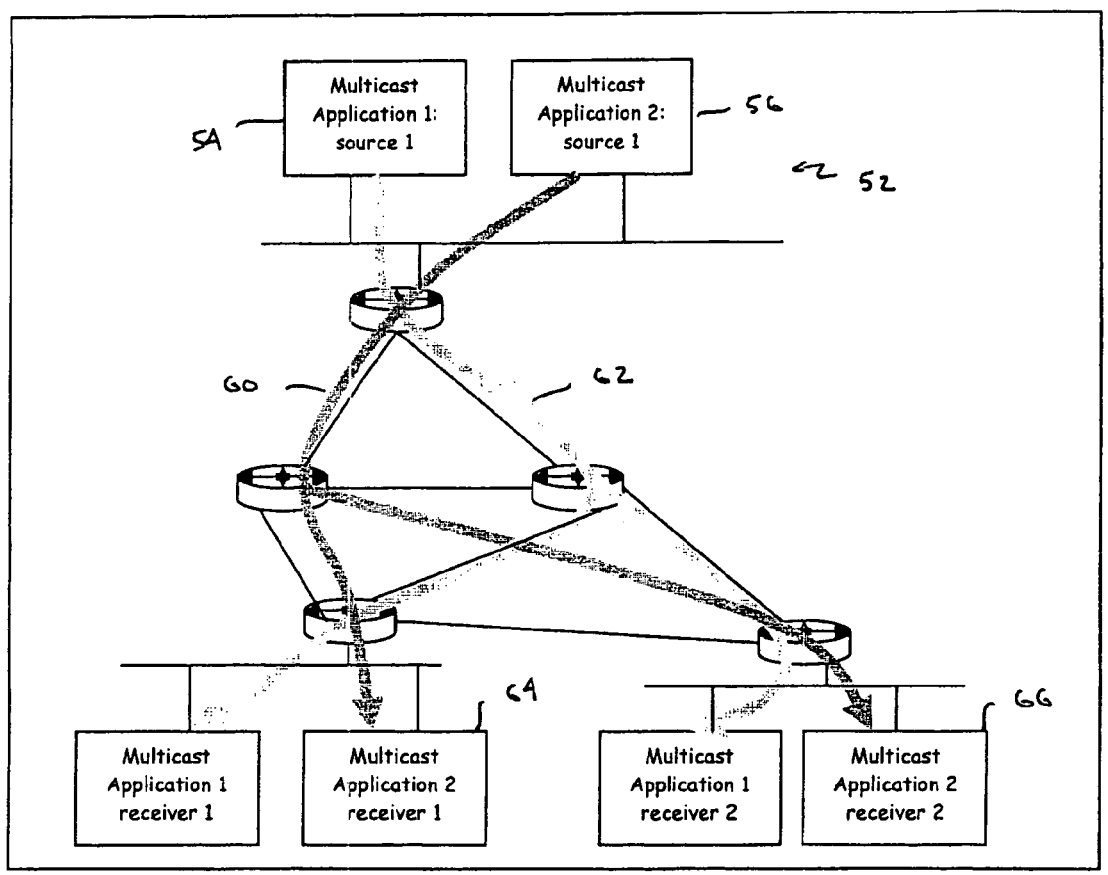

To illustrate this point, an exemplary multicasting configuration is further described in relation to FIGS. 3 and 4. In FIG. 3, two multicast source applications 54, 56 are located in a first subnet 52; whereas, a multicast destination application for each of these two source applications are located in two other subnets 58, 59. In this example, it is possible for the multicast session management system 10 to allocate the same path designated as 60 for both of the applications. To do so, the same multicast address is shared by both applications, but each application employs a different transport layer port number in order to distinguish the sessions.

Suppose that the session requirements for the first application 54 change (e.g., require more bandwidth) so that the allocated path can no longer meet the requirements. The multicast session management system 10 may opt to recompute a path which can support the new requirements. If such a path is available, the network and routing manager provisions the network accordingly.

Alternatively, it may be necessary to segment the sessions to meet the new requirements as shown in FIG. 4. In this instance, the multicast session management system 10 determines a new path for the application as indicated at 62. It is envisioned that the new path may be selected from a currently allocated path. If applicable, the new path is assigned an available multicast address. The newly assigned address is then recorded in the session registry as well as communicated to the applications associated with the session. In this example, applicable applications are designated as 56, 64 and 66 By using the newly assigned address, the multicast session has been switched to a new path.

In many instances, a change in the multicast address is sufficient to switch a session to a new path. However, in other instances, it may be necessary to reassign the port number in order to distinguish the session from a session currently using the newly assigned multicast address. The multicast session management system of the present invention provides the flexibility to change either the multicast address, port number, or both.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multicast session management system comprising:
    a multicast application that initiates a request for a multicast session;
    a session manager receives the session request from the multicast application that assigns a multicast address for the requested multicast session; and
    a routing and network manager for managing network resources, wherein the session manager interacts with the routing and network manager to allocate network resources for the requested multicast session before the multicast address is communicated to the multicast application, wherein the routing and network manager receives flow pattern information for the requested multicast session and determines at least one path for the requested multicast session.

2. The multicast session management system of claim 1 wherein the session manager maintains a pool of available multicast addresses and selects an available multicast address from the pool upon receipt of the session request.

3. The multicast session management system of claim 1 wherein the session manager interfaces with an external server to obtain an available multicast address in accordance with Multicast Address Dynamic Client Allocation Protocol.

4. The multicast session management system of claim 1 further comprises a security manager that issues digital certificates.

5. The multicast session management system of claim 4 wherein the session manager is in data communication with the security manager and validates digital certificates with the security manager.

6. The multicast session management system of claim 1 wherein the routing and network manager communicates a multicast address associated with an existing path to the session manager when the existing path can be used by the requested multicast session.

7. The multicast session management system of claim 1 wherein the routing and network manager requests a multicast address be assigned by the session manager when at least one new path is needed for the requested multicast session.

8. A multicast session manager for a multicast distribution system, comprising:
    a session registry that stores session information for registered multicast sessions, including an assigned multicast address for each registered session;
    a session management service that receives a request for a multicast session from a multicast application and assigns a multicast address for the requested multicast session; and
    a network management interface that interfaces with an external routing and network manager to allocate network resources for the requested multicast session, wherein the session management service communicates the multicast address to the multicast application only after network resources have been allocated for the requested multicast session, the network management interface communicates flow pattern information for the requested multicast session to the routing and network manager.

9. The multicast session manager of claim 8 further comprises a pool of available multicast addresses which may be assigned to a requested multicast session.

10. The multicast session manager of claim 8 further comprises an address interface that interfaces with an external server to obtain an available multicast address for a requested multicast session.

11. The multicast session manager of claim 8 further comprises a security management interface that interfaces with a security manager to obtain and validate digital certificates.

12. The multicast session manager of claim 8 wherein the network management interface receives a multicast address associated with an existing path from the routing and network manager when the existing path can be used by the requested multicast session and the session management service updates the session registry with the multicast address assigned to the requested multicast session.

13. The multicast session manager of claim 8 wherein the network management interface receives a request for a multicast address to be assigned when at least one new path is needed for the requested multicast session and communicates an assigned multicast address to the routing and network manager.

14. The multicast session manager of claim 8 further comprises a pool of available transport layer port numbers, wherein the session management service assigns a port number for each channel associated with a requested multicast session.

15. The multicast session manager of claim 8 wherein the session management service spawns a session monitor for each registered multicast session.

* * * * *